United States Patent [19]

Friedman et al.

[11] Patent Number: 4,575,461

[45] Date of Patent: Mar. 11, 1986

[54] EMULSIFYING AND HUMECTANT AGENT, METHOD OF MANUFACTURE AND BAKED PRODUCTS CONTAINING SAME

[75] Inventors: Robert B. Friedman, Chicago; Isaac R. West, South Holland, both of Ill.; Susan L. Furcsik, Crown Point, Ind.

[73] Assignee: American Maize-Products Company, Hammond, Ind.

[21] Appl. No.: 593,679

[22] Filed: Mar. 26, 1984

[51] Int. Cl.⁴ .................. A21D 13/00; A23L 1/00
[52] U.S. Cl. .................... 426/549; 426/653; 426/654; 426/662
[58] Field of Search ............ 426/549, 653, 658, 662, 426/548, 471; 127/29, 30

[56] References Cited

U.S. PATENT DOCUMENTS

| | | | |
|---|---|---|---|
| 3,533,802 | 10/1970 | Cooper | 426/549 |
| 3,718,484 | 2/1973 | Glabe et al. | 426/658 |
| 3,833,413 | 9/1974 | Glabe et al. | 426/459 |
| 3,906,114 | 9/1975 | Glabe et al. | 426/459 |
| 4,049,466 | 9/1977 | Walon | 127/29 |
| 4,303,684 | 12/1981 | Pitchon | 426/658 |

*Primary Examiner*—Raymond Jones
*Assistant Examiner*—Elizabeth A. King
*Attorney, Agent, or Firm*—Lucas & Just

[57] ABSTRACT

An additive for food, especially baked goods, the method of manufacture and the baked goods produced therewith are disclosed. The additive is comprised of about 8 to about 40% by weight fructose, about 45 to about 80% by weight starch hydrolysate with a DE of about 5 to about 36 and about 0.5 to about 20% by weight emulsifying agent.

21 Claims, No Drawings

EMULSIFYING AND HUMECTANT AGENT, METHOD OF MANUFACTURE AND BAKED PRODUCTS CONTAINING SAME

The present invention relates to an additive particularly adapted for use in baked goods which comprises a multicomponent admixture of fructose, starch hydrolysate, and an emulsifying agent. It has been discovered that when an aqueous admixture of fructose, starch hydrolysate and emulsifying agent is dried, the dried particles are free flowing which is of convenience in handling for use as ingredients in food products. The free flowing dried admixture is of particular advantage when added to the batter of baked goods. New and surprising results occur which include but are not limited to, a reduction in key ingredients such as cocoa, eggs and shortening and an increase in the humectancy and stability of the baked good itself.

There is a constant need within the baking industry to have improved handling and mixing distribution of ingredients to include emulsifying agents. Such improved handling and mixing distribution provides economic and advantageous uniform distribution of ingredients throughout the batter. In accordance with the present invention, uniform distribution of ingredients is achieved by means of the free flowing particulate admixture and as a result a decrease in the amount of each ingredient which is needed in the baked good may be employed.

Texture of a baked good as well as shelf life are of constant concern to a baker also. Increased shelf life of a baked good means extended freshness and increased selling range. It has been surprisingly found that such characteristics may be imparted to baked good by using the dried solids admixture of the present invention.

The admixture of the present invention is easier to mix with baking ingredients than the three dried components when they are individually added to baking ingredients. It is also surprisingly noted that the admixture of the present invention has improved emulsification properties over the three dry components when these three dried components are added as separate individually dried components to the same bake mix. These surprising emulsification properties include ease of blending, improved even baking, enhanced handling and cutting of the baked product. Along with the improved emulsification properties comes a reduction in mixing time and an extension of shelf life through moisture control.

Fructose is hard to store and ship due to its hygroscopic nature. The dried solids admixture of the present invention is easily stored under normal conditions (18°-25° C.) and is easily handled thus overcoming some of the problems encountered due to the hygroscopic nature of fructose.

The mechanism which leads to these surprising results is not exactly known. It is hypothesized that when the three components are dried together the starch hydrolysate in some way provides stability to the fructose and emulsifying agent. When added to the batter the resulting baked goods tend to have a better retention of moisture for added shelf life freshness.

In general, the admixture is comprised of about 8% to about 40% by weight of fructose; about 45% to about 80% by weight of starch hydrolysate wherein the starch hydrolysate has a dextrose equivalent (D.E.) of about 5 to about 36; and about 0.5% to about 20% by weight of an emulsifying agent.

The fructose used in the admixture can be from any commercial source which is available. Generally, fructose is in the form of high fructose corn syrup (H.F.C.S.) but it is also available in dry solids form. Such sources of fructose are well known within the industry. For the purposes of this invention, a high fructose corn syrup must have about 42% fructose or more. One such source of H.F.C.S. is from American Maize-Products Company under the trademark TRU-SWEET 42. TRU-SWEET 42 is a high fructose corn syrup which contains about 42% fructose. High fructose corn syrups often run about 90% fructose.

The best mode for carrying out the present invention is to use a high fructose corn syrup with about 90% fructose content. It will, however, be appreciated that any type of fructose can be used.

It will be appreciated that the content of fructose in the dried admixture can vary between about 8 to about 40% by weight. The best mode for this invention is to have a dry admixture with about 15 to about 35% by weight of fructose.

Starch hydrolysates are well-known in the industry. Starch hydrolysates are produced from the hydrolysis of starch or modified starch. The starch or modified starch used for the starch hydrolysate of the present invention can come from any of the well-known sources of starch such as wheat, rice, corn, potato and other roots having a high starch content. It will be understood that this list is in no way exhaustive of the different sources of starch. The conversion of starch to a starch hydrolysate can occur through an acid, base or enzyme conversion, typically acid or enzyme is used. Starch is often classified as waxy and non-waxy where the former may be almost 100% amylopectin and the later is a mixture of amylopectin and amylose. Any of the conventional enzyme conversions of starch may be used but it is preferred to use alpha amylase enzyme for converting the starch in known manner. Acid conversion of the starch to hydrolysate is well-known and any conventional procedure for acid conversion may be used.

The best mode for carrying out the present invention is to utilize a starch hydrolysate produced from an enzyme conversion of a waxy starch.

The degree of hydrolysis of the starch hydrolysate is also a key factor of the present invention. The starch hydrolysate should have a dextrose equivalent (D.E.) of about 5 to about 36. It is understood within the industry that to obtain a starch hydrolysate of a specific DE that one need only control the hydrolysis reaction in known manner. Numerous starch hydrolysates are available in the commercial market. One source of starch hydrolysates for use in the present invention available in the market today are American Maize-Products Company hydrolysates sold under the trademark LO-DEX which have DE's of about 5 to about 16 and under the trademark FRODEX 22which is an enzyme converted hydrolysate having a DE of about 18 to 22.

The optimum DE for the starch hydrolysate for the present invention is a DE of about 8 to about 29.

The emulsifying agent may be any of those conventionally used in food products. Best results are achieved in accordance with the present invention by using a lecithin emulsifying agent. Lecithin is a phosphoglyceride or a phosphatide which is found in living organisms both animal and plant. It is abundant in egg yolks, corn, soybean oil and other vegetable seeds. A typical commerical source of lecithin is soybeans. Lecithin is commercially available under the trademarks LECITHOL, VITELLIN, KELECIN, GRANULESTIN, and CENTROLEX F. CENTROLEX F is a soybean lecithin which is granulated and essentially free of soybean oil. These sources are no where near exhaustive and it will be understood that any source of lecithin may be used in the present invention.

The best mode for carrying out the present invention is to utilize soybean lecithin which is granulated and essentially free of soybean oil.

To carry out the present invention, the best mode is an admixture of about 15 to about 35% by weight of fructose, about 50 to about 80% by weight of starch hydrolysate wherein the starch hydrolysate has a DE of about 8 to about 29 and the starch hydrolysate was obtained from an enzyme converted waxy starch, and about 0.5 to about 15% by weight of emulsifying agent wherein the emulsifying agent is soy lecithin.

In general, the process for making the admixture is a five step process. The steps include: (1) forming an aqueous admixture of starch hydrolysate, fructose and emulsifying agent; (2) mixing the three components in the aqueous admixture; (3) heating the aqueous admixture which contains the three components; (4) drying the aqueous admixture to a solid state; and (5) size reduction such that the admixture is a free flowing particulate product. Any convenient order may be used for adding the ingredients to form the aqueous admixture.

The first step of forming an aqueous mixture requires a measuring of the three components and then addition of the fructose and emulsifying agent to an aqueous solution of the starch hydrolysate. The aqueous admixture may contain from about 25 to about 55% solids (dry basis) by weight. If the starch hydrolysate is initially dry then a solution of starch hydrolysate will be made up before the other two ingredients are added.

The mixing step of the admixture can be brought about by any conventional mixing technique such as an impeller.

The heating of the admixture which contains the three components occurs by raising the temperature of the admixture to between about 40° to about 60° C. For best results the mixture is heated to between about 50° C. to about 55° C.

Drying of the aqueous admixture containing the three components can occur in any conventional method to include both hot and freeze drying techniques. The best practice for this invention occurs when the aqueous solution is spray dried in conventional manner. For best results when using a spray drier the inlet temperature should be about 150° C. to about 200° C. and the outlet temperature is about 75° C. to about 100° C. wherein the product flow rate is about 100 to about 250 ml. per minute.

The size reduction is done by any conventional means such that the admixture is a free flowing powdery product. Generally, it is not necessary to reduce the size of the particles conventionally obtained by spray drying.

For best results of the present invention, the following steps are followed to produce the admixture: (1) add fructose and emulsifying agent to an aqueous solution of starch hydrolysate containing about 30 to about 40% solids (dry basis) by weight; (2) mix the three components together; (3) heat the mixture to a temperature of about 50° C. to about 55° C.; and (4) spray dry the mixture wherein the inlet temperature is about 150° C. to about 200° C., the outlet temperature is about 75° C. to about 100° C., and the product flow rate is about 100 to about 250 ml. per minute to obtain a free flowing particulate product.

Further details of the present invention will be understood by reference to the following examples which illustrate several embodiments thereof to include the baked goods which contain the admixture.

EXAMPLE 1

The example describes a preferred mode of making the admixture. To an aqueous solution of FRODEX 22, previously described, is added CENTROLEX F, previously described, and high fructose corn syrup with 90% fructose. The percentage of the three components being 76.75%, 0.5% and 22.75% respectively to form an aqueous admixture containing 35% solids by weight (dry basis). The solution is mixed. The mixture is then heated to between 50°-55° C. and then spray dried. The spray drier has an inlet temperature of 150°-200° C. and an outlet temperature of 75°-100° C. The product flow rate through the spray drier is 100-250 ml. per minute. The resulting particulate admixture was free flowing.

EXAMPLE 2

This example describes Granola bar made in known manner using the following batter formula containing the admixture of the present invention.

| Ingredients | Amount, percent |
| --- | --- |
| Granola (18% sugar) | 34.0 |
| Crisp Rice | 13.0 |
| Almonds | 3.5 |
| Coconuts (medium) | 5.0 |
| Dextrose | 3.0 |
| TRU-SWEET 42 | 16.0 |
| Brown sugar | 1.0 |
| Salt | 0.3 |
| Vanilla extract | 0.2 |
| Glycerine | 2.0 |
| Shortening | 6.0 |
| Real chocolate chips (4000 ct.) | 9.0 |
| Admixture of Example 1 | 7.0 |
| | 100.0 |

EXAMPLE 3

This Example describes a brownie baked in conventional manner having the following batter formula using the admixture of Example 1.

| Ingredients | Amount, percent |
| --- | --- |
| Sugar | 36.70 |
| Cake Flour | 21.30 |
| Bread Flour | 5.28 |
| Shortening | 16.0 |
| Cocoa | 7.00 |
| Non-fat Dry Milk | 2.50 |
| Whole Egg Solids | 2.00 |
| Salt | 0.85 |
| B.P. PYRO (Stauffer) | 0.17 |
| Soda | 0.10 |
| International Brand V Flavor | 0.10 |
| Admixture of Example 1 | 8.00 |
| | 100.00 |

B.P. PYRO is a trade name for sodium acid pyrophosphate sold by Stauffer Chemical Co.

EXAMPLE 4

This Example describes the use of the admixture in a brownie premix. A premix is a mixture of ingredients which are prepared before hand and designed to be mixed later with other ingredients. Premixes are often found in the grocery store and used in the household where only a few common household ingredients are needed to be added to complete the batter.

| Ingredients | Amount, percent |
| --- | --- |
| Fine granulated Sugar | 33.90 |
| Shortening | 11.83 |
| Cake Flour | 11.73 |
| All-Purpose Flour | 11.73 |
| Natural Cocoa | 3.74 |
| Red Dutch Cocoa | 3.74 |
| Instant Starch | 1.32 |
| Dried Egg Whites | 0.65 |
| Flour Salt | 0.51 |
| Vanilla #218 Flavoring | 0.36 |
| Sodium Bicarbonate | 0.03 |
| Admixture of Example 1 | 20.46 |
| | 100.00 |

EXAMPLE 5

This Example uses the premix of Example 4 plus typical household ingredients of Crisco oil and whole fresh eggs to make a brownie.

| Ingredients | Amount, percent |
| --- | --- |
| Fine granulated Sugar | 28.88 |
| Shortening | 10.08 |
| Cake Flour | 10.00 |
| All purpose Flour | 10.00 |
| Natural Cocoa | 3.18 |
| Red Dutch Cocoa | 3.18 |
| Instant Starch | 1.12 |
| Dried Egg White | 0.55 |
| Flour Salt | 0.44 |
| Vanilla #218 Flavoring | 0.30 |
| Sodium Bicarbonate | 0.02 |
| Oil | 7.88 |
| Whole Fresh Eggs | 6.94 |
| Admixture of Example 1 | 17.43 |
| | 100.00 |

The foregoing ingredients were baked at 350° F. for thirty (30) minutes.

EXAMPLE 6

This Example illustrates the unexpected and surprising result of how key ingredients such as shortening, cocoa, and eggs can be reduced from a brownie batter when the admixture of the present invention is used to produce commercially acceptable brownies. Before a reduction in ingredients could be attempted a control brownie was established from conventional ingredients. FORMULA A below provided an excellent chewy moist brownie to use as a control brownie. FORMULA A does not have the admixture of the present invention.

| FORMULA A | |
| --- | --- |
| Ingredient | Amount, percent |
| Fine granulated Sugar | 25.53 |
| Shortening | 8.91 |
| Cake Flour | 8.84 |
| All-Purpose Flour | 8.84 |

| -continued | |
| --- | --- |
| FORMULA A | |
| Ingredient | Amount, percent |
| Natural Cocoa | 2.81 |
| Red Dutch Cocoa | 2.81 |
| Instant Starch | 0.99 |
| Dried Egg Whites | 0.49 |
| Salt, Flour | 0.39 |
| Vanilla #218 Flavoring | 0.27 |
| Sodium Bicarbonate | 0.02 |
| Soy Oil | 6.97 |
| Fresh Whole Eggs | 6.14 |
| Distilled Water | 7.96 |
| TRU-SWEET 42 | 3.69 |
| 43/62 CSU | 15.34 |
| | 100.00 |

The foregoing ingredients were baked at 350° C. for thirty (30) minutes.

Using the brownie formula of Example 5 above, certain key ingredients were reduced and the product brownie was tested against the control brownie of FORMULA A. From Example 5 the following ingredients were reduced by the indicated amount:

a. shortening reduced by 10%;
b. cocoa reduced by 15%;
c. fresh eggs reduced by 10%.

To make up the difference cake flour was added. It was found that the baking temperature of the brownie with reduced ingredients had to be baked at 375° F. (25° F. higher than the brownie of FORMULA A and of the brownie in Example 5 above). The new brownie with the foregoing reduction in key ingredients in actual taste testing was virtually indistinguishable from the control brownie of FORMULA A. The overall effect of the admixture in the brownie batter was to improve the distribution of ingredients and effect a surprising reduction in expensive key ingredients.

It was found that despite the reduction in cocoa by 15% that the new brownie had excellent chocolate flavor and excellent brown color.

It was also found that the reduction in the amount of shortening increased the viscosity of the new brownie batter over the FORMULA A of the control brownie batter. The new brownie also had moderately even texture when compared to the control brownie.

The reduction in fresh eggs in the new brownies did not effect the flavor of the new brownies. Thus the new brownies had a flavor surprisingly equivalent to the control FORMULA A brownies.

EXAMPLE 7

This Example illustrates the surprising results which are obtained by the admixture of the present invention as compared to adding each of the ingredients separately.

FORMULA B below shows the ingredients of a brownie that contains the admixture of the present invention. FORMULA C below discloses the ingredients of a brownie made by the separate addition of the individual ingredients that are used to make up the admixture. Unique and surprising results are shown from this comparison.

It was found that the brownie of FORMULA C lacked the desired ease of cutting and did not have a clean mouth feel which was present in the FORMULA B brownie. The brownie of FORMULA B had darker richer chocolate color than the brownie of FORMULA C. Ease of cutting and clean mouth feel with lack of gumminess, which was displayed by the brownie of FORMULA B and not by the brownie of FORMULA C, are advantageous characteristics most desired in the baking industry. It was also found that the admixture dispersed with greater ease than when the individual ingredients of the admixture were added separately. Thus the brownies made with the new admixture showed unexpected advantages of ease of cutting, clean mouth feel without gumminess, darker richer chocolate color and an ease of dispersion within the batter, over the brownie of FORMULA C.

| FORMULA B | |
|---|---|
| Ingredient | Amount, percent |
| Sugar | 36.95 |
| Cake Flour | 26.00 |
| Bread Flour | 6.50 |
| Shortening | 13.00 |
| Cocoa | 6.00 |
| Non-fat Dry Milk | 2.50 |
| Whole Egg Solids | 1.75 |
| Salt | 0.85 |
| B.P. PYRO | 0.20 |
| Soda | 0.15 |
| International Brand V Flavor | 0.10 |
| Admixture | 6.00 |
| | 100.00 |

The foregoing ingredients were baked at 350° F. for twenty seven (27) minutes.

| FORMULA C | |
|---|---|
| Ingredients | Amount, percent |
| Sugar | 36.95 |
| Cake Flour | 26.00 |
| Bread Flour | 6.50 |
| Shortening | 13.00 |
| Cocoa | 6.00 |
| Non-fat Dry Milk | 2.50 |
| Whole Egg Solid | 1.75 |
| Salt | 0.85 |
| B.P. PYRO | 0.20 |
| Soda | 0.15 |
| International Brand V Flavor | 0.10 |
| FRODEX 22 | 4.60 |
| Fructose | 1.23 |
| Dextrose | 0.14 |
| Dry Lecithin | 0.03 |
| | 100.00 |

The foregoing ingredients were baked at 350° F. for twenty seven (27) minutes.

It can be appreciated that the use of this admixture is also possible in sweeteners, flavors, coloring agents, coffee extracts, tea extracts, synthetic creamers or coffee whiteners, breads, pastries, beverage mixes and powders, dairy products, gravy mixes, spice mixes, sauce mixes, whipped toppings and whipped potatoes.

The Examples and description given above of the present invention is intended to illustrate preferred embodiments to those skilled in the art of the admixture, the method of its manufacture and baked products containing the admixture. The above, however, is not intended to detail all the obvious modifications and variations of this invention which will become apparent to those of ordinary skill in the art. It will be understood that it is intended to cover all changes and modifications of the preferred embodiment of the invention herein chosen for the purpose of illustration which do not constitute a departure from the spirit and scope of the invention.

What is claimed is:

1. A dried particulate additive for baked goods comprising an admixture of about 8 to about 40% by weight fructose, about 45 to about 80% by weight starch hydrolysate having a DE of about 5 to about 36, and about 0.5 to about 20% by weight an emulsifying agent.

2. The admixture of claim 1 wherein the fructose is present in the amount of about 15 to about 35% by weight.

3. The admixture of claim 1 wherein the starch hydrolysate was derived from a waxy starch by enzyme conversion.

4. The admixture of claim 1 wherein the starch hydrolysate has a DE of about 8 to about 29.

5. The admixture of claim 1 wherein the emulsifying agent in lecithin.

6. The admixture of claim 1 wherein the emulsifying agent is soy lecithin.

7. The admixture of claim 1 wherein the emulsifying agent is a phosphoglyceride.

8. The admixture of claim 1 wherein the emulsifying agent is a phosphatide.

9. A dried particulate additive for baked goods comprising an admixture of about 15 to about 35% by weight of fructose, about 50 to about 80% by weight starch hydrolysate said starch hydrolysate with a DE of about 8 to about 29 and said starch hydrolysate being derived from enzyme converted waxy starch, and about 0.5 to about 15% by weight emulsifying agent said emulsifying agent being soy lecithin.

10. The process of forming a dry particulate admixture which comprises the step of drying an aqueous admixture of about 8 to about 40% by weight fructose said fructose having a high corn syrup solid with 42% or more fructose, about 45 to about 80% by weight starch hydrolysate having a DE of about 5 to about 36 and about 0.5 to about 20% by weight emulsifying agent.

11. The process of claim 10 wherein the high fructose corn syrup is about 90% fructose.

12. The process of claim 10 wherein the starch hydrolysate has a DE of about 8 to about 29.

13. The process of claim 10 wherein the high fructose corn syrup is present in the amount of about 15 to about 35% by weight.

14. The process of claim 10 wherein the starch hydrolysate in the amount of about 50 to about 80% by weight.

15. The process of claim 10 wherein the emulsifying agent is lecithin.

16. The process of claim 10 wherein the emulsifying agent is soy lecithin.

17. The process of claim 10 wherein said drying is accomplished by spray drying.

18. The process of forming a dry particulate admixture which comprises the step of spray drying an aqueous admixture of about 15 to about 35% by weight fructose said fructose having a high fructose corn syrup which contains 90% fructose, about 50 to about 80% starch hydrolysate having a DE about 8 to about 29, and about 0.5 to about 15% by weight of soy lecithin.

19. A baked product formed from baking ingredients having an essential ingredient thereof the admixture comprising about 8 to about 40% by weight fructose, about 45 to about 80% by weight starch hydrolysate having a DE of about 5 to about 36, and about 0.5 to about 20% by weight lecithin.

20. A baked product of claim 19 wherein the admixture comprises about 15 to about 35% by weight fructose, about 50 to about 80% by weight starch hydrolysate having a DE of about 8 to about 29, and about 0.5 to about 15% by weight of lecithin.

21. A baked product having as an essential ingredient an admixture comprising about 8 to about 40% by weight fructose, about 45 to about 80% by weight starch hydrolysate having a DE of about 5 to about 36 and about 0.5 to about 20% by weight of an emulsifying agent.

* * * * *

UNITED STATES PATENT AND TRADEMARK OFFICE
CERTIFICATE OF CORRECTION

PATENT NO.   :   4,575,461
DATED        :   March 11, 1986
INVENTOR(S)  :   Robert B. Friedman et al.

It is certified that error appears in the above-identified patent and that said Letters Patent is hereby corrected as shown below:

Claim 10, line 6, after "hydrolysate", insert --said starch hydrolysate--.

Claim 14, line 2, before "in the", insert --is present--.

Signed and Sealed this

Second Day of September 1986

[SEAL]

Attest:

DONALD J. QUIGG

Attesting Officer

Commissioner of Patents and Trademarks